H. R. HUGHES.
WELL DRILLING APPARATUS.
APPLICATION FILED DEC. 13, 1912.
1,094,904.
Patented Apr. 28, 1914.
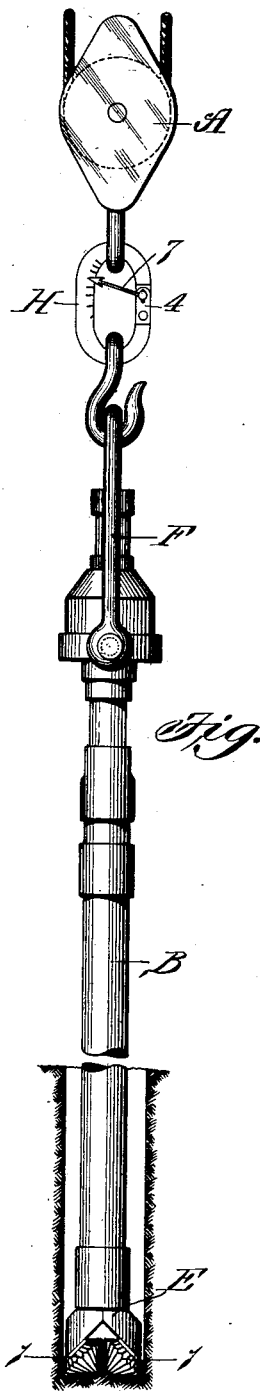
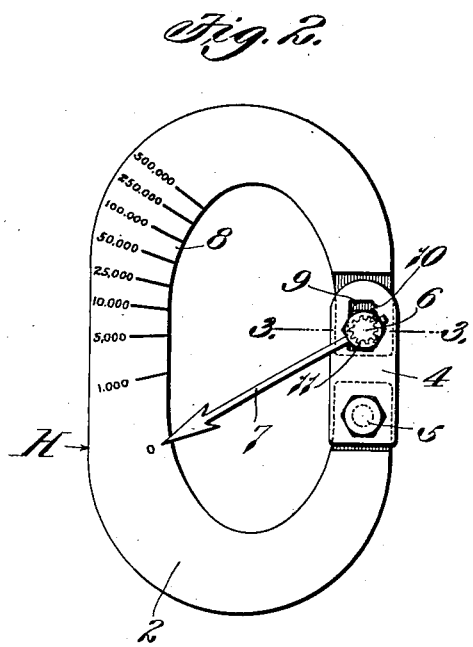
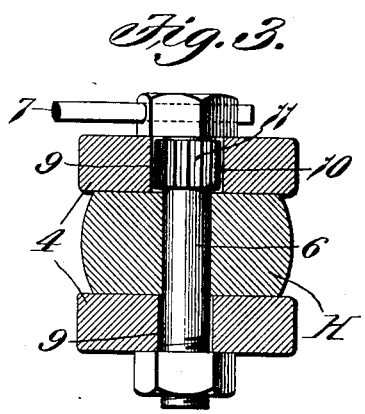
Witnesses:
Geo. R. Ladson
C. M. Badger
Inventor,
Howard R. Hughes.
By Bakewell Chure Latty

UNITED STATES PATENT OFFICE.

HOWARD R. HUGHES, OF HOUSTON, TEXAS.

WELL-DRILLING APPARATUS.

1,094,904.  Specification of Letters Patent.  Patented Apr. 28, 1914.

Application filed December 13, 1912. Serial No. 736,494.

*To all whom it may concern:*

Be it known that I, HOWARD R. HUGHES, a citizen of the United States, residing at Houston, Texas, have invented a certain new and useful Improvement in Well-Drilling Apparatuses, of which the following is a full, clear, and exact description, such as will enable others skilled in the art to which it appertains to make and use the same.

This invention relates to apparatuses that are used for drilling wells, and has for its main object to provide an apparatus of the character described which comprises means for indicating the approximate weight imposed on the drilling tool so that the operator can regulate the weight on the tool and thus obtain the greatest efficiency from the tool.

Another object is to provide a well-drilling apparatus that comprises a roller drill bit, a drill stem that carries the bit, a derrick or other suitable hoisting mechanism, and a device provided with a weight-indicating means for connecting the drill stem to the hoisting mechanism. And still another object is to provide a "C-link" of novel construction that is adapted to be used for connecting a load to the traveling block of a hoisting apparatus, and which comprises a scale and a coöperating pointer that moves relatively to the scale when the weight of the load on the "C-link" varies.

Figure 1 of the drawings is a side elevational view of a well-drilling apparatus constructed in accordance with my invention; Fig. 2 is a side elevational view of my "C-link" that is used for connecting the drill stem to the hoisting mechanism; and Fig. 3 is an enlarged horizontal sectional view taken on the line 3—3 of Fig. 2.

Referring to the drawings which illustrate the preferred form of my invention, A designates the traveling block or pulley of a derrick or other suitable hoisting mechanism, B designates a drill stem formed from a string of pipe, and E designates the drilling tool that is mounted on the lower end of the drill stem, the tool herein shown being provided with two approximately frusto-conical-shaped cutting rollers 1. The drill stem B is sustained or supported by an elevator F of any suitable type or design, and said elevator is connected to the traveling block A of the hoisting mechanism by means of a "C-link" H that is provided with means for indicating the approximate weight of the drill stem B, thereby enabling the operator to regulate the load imposed on the drilling tool and thus obtain the greatest efficiency from said tool. The "C-link" H consists of a substantially C-shaped member 2, two straps or bars 4 arranged on opposite sides of said member so as to close the opening or cut-out portion at one side of said member, a bolt or other suitable fastening device 5 passing transversely through the lower ends of the bars 4 and through the C-shaped member 2, as shown in Fig. 2, so as to connect said parts together, a member 6 journaled in the member 2 at a point above the opening or cut-out portion in the side of said member and provided with a pointer 7 that coöperates with a scale 8 formed on the member 2, and coöperating means on one of the links 4 and on the member 6 for causing said member 6 to oscillate when the C-shaped member 2 is elongated or subjected to a pulling strain which tends to cause said member 2 to open further.

In the preferred form of my invention as herein shown, both of the links 4 are provided with elongated slots 9 through which the oscillating member 6 passes, and one of said links is provided with rack teeth 10, as shown in Fig. 2, that mesh with a gear or pinion 11 on the member 6, as shown in Fig. 3, but I do not wish it to be understood that my broad idea is limited to the exact construction herein shown for various means could be employed for indicating the relative degree of movement of the upper and lower portions of the C-shaped member 2 without departing from the spirit of my invention.

When the apparatus is in use the pulling strain or downward pressure which the drill stem B exerts on the lower part of the C-shaped member 2 causes the top and bottom portions at the split side of said member 2 to separate more or less according to the weight of the drill stem and thus automatically move the pointer 7 upwardly over the scale 8 so as to register the approximate weight of the drill stem, the upward movement of the pointer 7, of course, being effected by the downward movement of the rack-toothed link 4 that meshes with the pinion 11 on the member 6 to which the pointer is connected. By examining the scale 8 the operator can determine whether or not the weight of the drill stem is too great to obtain the greatest efficiency from the drilling tool E, and if he finds that the drill stem imposes too great a load on the drilling tool he can manipulate the hoisting mechanism so as to relieve or reduce the weight on the drilling tool. Consequently, with a well-drilling apparatus of the construction above-described the operator can accurately regulate the weight imposed on the drilling tool and thus obtain the maximum efficiency from the tool, this feature of my apparatus making it particularly adaptable for use with a roller drill bit of the type herein shown on account of the fact that too much weight or pressure on such a bit causes the rollers to slide over the material being operated on instead of cutting into the material. While my broad idea consists in a well-drilling apparatus provided with means for indicating the weight of the drill stem to which the drilling tool is connected, still one feature of my invention consists in a "C-link" of the kind herein shown irrespective of the specific purpose for which it is used.

Having thus described my invention, what I claim as new and desire to secure by Letters Patent is:

1. A device for connecting a load to a hoisting apparatus, consisting of a link, one of whose sides is provided with an opening so as to permit the upper and lower portions of the link to move relatively to each other, a closure for said opening consisting of a member that is connected to said link at one side of said opening so that it will move with the portion of the link to which it is connected, a movable indicator carried by said link and arranged on the opposite side of said opening, and means for transmitting the movements of said member to said indicator.

2. A device for connecting a load to a hoisting apparatus, consisting of an elongated link having an opening at one side which permits the upper and lower portions of the link to move relatively to each other, an indicator oscillatingly mounted in said link at one side of said opening, a removable member connected to the link at the other side of said opening so as to close the opening when the device is in use, and coöperating means on said member and indicator for causing the indicator to move when the upper and lower portions of the link move relatively to each other.

3. A device for the purpose described, comprising a substantially C-shaped link provided at one side with an opening or cutout portion, a bar or strap that closes said opening, said bar having an elongated slot, a member carried by said link and projecting through the elongated slot in said bar, a pointer on said member, and coöperating teeth on said bar and member that cause said member to rotate and thus shift said pointer when the bar is moved by the opening up or elongation of the link.

4. A device for the purpose described, comprising a link provided with two sides, one of which has an opening, a bar or strap for closing said opening, bolts passing through said link and bar above and below the opening in the link, the bar being provided with an elongated slot through which the upper bolt passes, said upper bolt having teeth, a scale on the link, a pointer coöperating with said scale and connected to the upper bolt, and rack teeth on said bar that mesh with the teeth on said upper bolt.

In testimony whereof I hereunto affix my signature in the presence of two witnesses, this sixth day of December, 1912.

HOWARD R. HUGHES.

Witnesses:
WELLS L. CHURCH,
GEORGE BAKEWELL.

Copies of this patent may be obtained for five cents each, by addressing the "Commissioner of Patents. Washington, D. C."